Patented Sept. 29, 1953

2,653,866

UNITED STATES PATENT OFFICE 2,653,866

ALLYL FURFURYLIDENECYANOACETATE HERBICIDE

David T. Mowry and Arthur H. Schlesinger, Dayton, Ohio, assignors to Monsanto Chemical Company, St. Louis, Mo., a corporation of Delaware No Drawing. Application March 22, 1951, Serial No. 217,062

5 Claims. (Cl. 71—2.5)

This invention relates to compounds of the furan series and provides the hitherto unknown and valuable allyl furfurylidenecyanoacetate, a method of producing the same, and herbicidal compositions containing the new compound.

Allyl furfurylidenecyanoacetate has the formula

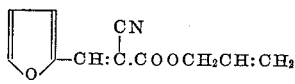

It is a highly stable, yellow crystalline compound which may be used for a variety of industrial and agricultural applications and which we have found to be particularly valuable as a herbicide. It is obtained in good yields by contacting furfural with allyl cyanoacetate.

We have found that the reaction of furfural with allyl cyanoacetate to give the present compound occurs readily at ordinary or moderately elevated temperatures and in the presence or absence of catalysts. Condensation occurs by simply contacting the furfural with the cyanoacetate and allowing the reaction mixture to stand for a time of say, several hours to several days until formation of the furfurylidenecyanoacetate. For optimum yields of the allyl furfurylidenecyanoacetate however, we prefer to effect the reaction at ordinary temperature and in the presence of a basically reacting catalyst. As catalyst there may be employed inorganic or organic basically reacting materials such as the inorganic hydroxides or alkaline salts thereof, e. g., sodium or potassium hydroxide, sodium carbonate, and potassium acetate; organic bases such as ethanolamine and pyridine, etc. It is also advantageous to effect the reaction in the presence of an inert solvent or dilutent, possible side-reactions being thereby avoided or mitigated. As inert diluents or solvents we may employ alcohols such as ethanol, isopropanol or butanol, ethers such as ethyl ether or isopropyl ether, ketones such as methyl ethyl ketone; hydrocarbons such as benzene, toluene or hexane, etc.

Inasmuch as the reaction is a condensation of one mole of the furfural with one mole of the allyl cyanoacetate, equimolar quantities of the reactants are advantageously employed. However, since any excess of either the aldehyde or the ester may be readily recovered from the final product, the quantity of reactants initially employed may be immaterial. The ease with which furfural condenses with allyl cyanoacetate to give the present 1:1 condensation product is surprising. While the reaction of furfural with alkyl cyanoacetates to yield alkyl furfurylidenecyanoacetates is known in prior art, the production of the present allyl furfurylidenecyanoacetate from allyl cyanoacetate and furfural is unexpected. The unsaturated character of the allyl cyanoacetate would be expected to lead to the formation of difficultly characterized higher condensation or copolymerization products of a doubtful, resinous character rather than to the the present well-defined valuable, crystalline compound.

While allyl furfurylidenecyanoacetate is advantageously employed as the active constituent of herbicidal compositions, it also finds use as a general biological toxicant, as a vulcanization modifier in the formulation of natural and synthetic rubber compositions and as a chemical intermediate in the preparation of compounds of the furan series which can be readily prepared from it by reaction at the two olefinic double bonds thereof.

The invention is further illustrated but not limited by the following examples.

Example 1

A mixture consisting of 48 g. (0.5 mole) of furfural, 62.5 g. (0.5 mole) of allyl cyanoacetate, 1.0 g. of sodium acetate and 200 ml. of 60% ethanol was allowed to stand at room temperature for about 16 hours. At the end of that time the crystals which had formed in the reaction mixture were filtered off and recrystallized from absolute alcohol. There was thus obtained 64.5 g. (64% theoretical yield) of the substantially pure allyl furfurylidenecyanoacetate, M. P. 69–70° C., and analyzing as follows:

|  | Calcd. for $C_{11}H_9O_3N$ | Found |
|---|---|---|
| Percent C | 65.02 | 65.02 |
| Percent H | 4.41 | 4.61 |

Example 2

The herbicidal activity of allyl furfurylidenecyanoacetate was determined by germination of cucumber seeds for 4 days at a temperature of 76° F. in the presence of an aqueous suspension of 100 parts of the ester per million parts of water. The primary root length of the resulting seedlings thus obtained was only 28% of the length of the primary roots of controls which had been germinated in water, in absence of the chemical.

The herbicidal activity of allyl furfurylidenecyanoacetate is surprising because related compounds do not possess herbicidal properties. When evaluated as described above, aqueous suspensions of a random group of such related compounds were found to test as follows:

| Compound Tested | Percent Growth at 100 Parts Per Million |
|---|---|
| Furfurylidenecyanoacetamide | 85 |
| Allyl cyanide | 95 |
| Diethyl furfurylidenemalonate | 83 |
| Furfurylideneacetone | 76 |
| Methallyl trichloroacetate | 99 |

The allyl furfurylidenecyanoacetate is preferably incorporated into a carrier when employed as a herbicide. As carriers there may be used water, hydrocarbon oils, organic solvents of the ester, dusts such as bentonite, pumice, talc, etc.

Dispersing or emulsifying agents are advantageously employed in the preparation of herbicidal sprays when employing allyl furfurylidenecyanoacetate as the active ingredient. Aqueous suspensions, oil-in-water emulsions, or solutions of the present compound in organic solvents may be prepared. The present allyl ester is preferably applied by spraying aqueous suspensions or emulsions of the same, this method affording an easy and inexpensive way of destroying plant growth. However, it is likewise effective when applied in agricultural dusts; or it may be used with water-insoluble insecticides, fungicides, etc. in customarily employed organic solutions.

What we claim is:

1. A herbicidal composition comprising a carrier and allyl furfurylidenecyanoacetate as the active ingredient, said allyl furfurylidenecyanoacetate being present in said composition in a phytotoxic concentration.

2. A herbicidal composition comprising an aqueous suspension of allyl furfurylidenecyanoacetate, said allyl furfurylidenecyanoacetate being present in said composition in a phytotoxic concentration.

3. A method of destroying undesirable plants which comprises applying to said plants a toxic quantity of a herbicidal composition containing allyl furfurylidenecyanoacetate as the active ingredient.

4. The method of destroying undesirable plants which comprises applying to said plants a toxic quantity of a herbicidal composition comprising a carrier and allyl furfurylidenecyanoacetate as the active ingredient.

5. The method of destroying undesirable plants which comprises applying to said plants a toxic quantity of an aqueous suspension of allyl furfurylidenecyanoacetate.

DAVID T. MOWRY.
ARTHUR H. SCHLESINGER.

References Cited in the file of this patent

UNITED STATES PATENTS

| Number | Name | Date |
|---|---|---|
| 2,435,780 | Heal | Feb. 10, 1948 |

OTHER REFERENCES

Smith et al., J. Economic Entomology, vol. 42 (1949), pgs. 439 to 444.

Heuck, Berichte der Deutschen Chem. Gesell., vol. 27, pg. 2625.

Thompson et al., Botanical Gazette, vol. 107 (1946), pages 475 to 507.